US005913212A

United States Patent [19]
Sutcliffe et al.

[11] Patent Number: 5,913,212
[45] Date of Patent: Jun. 15, 1999

[54] PERSONAL JOURNAL

[75] Inventors: Andrew B. Sutcliffe, Tyngsboro; Kevin A. Dunn, Boston, both of Mass.

[73] Assignee: Tele-Publishing, Inc., Boston, Mass.

[21] Appl. No.: 08/866,212

[22] Filed: Jun. 13, 1997

[51] Int. Cl.⁶ .................................................. G06F 17/30
[52] U.S. Cl. .................... 707/6; 707/9; 705/9; 705/38
[58] Field of Search ............................... 707/1, 6, 7, 10, 707/9; 705/5, 14, 37, 9, 38; 345/331; 379/88.22, 144; 380/23, 24; 370/392, 401; 434/336; 235/449; 281/31; 283/57, 58; 395/186, 701

[56] References Cited

U.S. PATENT DOCUMENTS

| | | | |
|---|---|---|---|
| 5,601,432 | 2/1997 | Bergman | 434/118 |
| 5,623,660 | 4/1997 | Josephson | 395/189.01 |
| 5,633,484 | 5/1997 | Zancho | 235/380 |
| 5,699,527 | 12/1997 | Davidson | 705/38 |
| 5,740,549 | 4/1998 | Reilly | 705/14 |
| 5,761,201 | 6/1998 | Vaudreuil | 370/401 |
| 5,790,426 | 8/1998 | Robinson | 705/6 |
| 5,796,395 | 8/1998 | De Hond | 345/331 |
| 5,814,798 | 9/1998 | Zancho | 235/380 |
| 5,826,241 | 10/1998 | Stein | 705/26 |

*Primary Examiner*—Thomas G. Black
*Assistant Examiner*—Diane D. Mizrahi
*Attorney, Agent, or Firm*—Nutter, McClennen & Fish, LLP

[57] ABSTRACT eThe personal journal system of the invention tracks personal contacts made by a first user of a personals system with other users of the system. The system may be implemented on a local computer network which may be accessed by remote users through a larger network such as the Internet. The system provides the first user with means for identifying other users of the system, means for generating journal entries corresponding to the other users, means for storing the journal entries and means for displaying the journal entries. The system may also provide searching matching functions for identifying other users, and electronic mail messaging.

14 Claims, 8 Drawing Sheets

JOURNAL DATA TABLE

| USER ID /166 | JOURNAL ID /168 | ENTERED /170 | LAST E-MAIL FROM /172 | E-MAIL FROM TEXT /174 | LAST E-MAIL TO /176 | E-MAIL TO TEXT /178 | COMMENTS /180 | STATUS /182 | SOURCE /184 |
|---|---|---|---|---|---|---|---|---|---|
| USER 1 | USER X | 5/7/97 | 5/8/97 | <TEXT> | 5/13/97 | <TEXT> | <TEXT> | Y | MAIL |
| USER 1 | USER Y | 5/30/97 | NEVER | NONE | NEVER | NONE | <TEXT> | N | AUTOMATCH |
| ... | ... | ... | ... | ... | ... | ... | ... | ... | ... |
| USER 2 | USER Y | 12/3/96 | 6/10/97 | <TEXT> | 5/1/97 | <TEXT> | <TEXT> | Y | SEARCH |
| ... | ... | ... | ... | ... | ... | ... | ... | ... | ... |

*Personals*
*On Line Network*

*Personal Journal*

Display format: [ Mail Summary ▼ ] [ Go! ]

These members are your journal:

For more information, or to edit comments, click on a member's handle.

| Member Name | Entered | Last Mail to: | Last Mail From: |
|---|---|---|---|
| caps | 05/07/1997 | 05/08/1997 | 05/13/1997 |
| path | 05/30/1997 | Never | Never |

2 entries.

You can also erase all the entries from your journal.

home | search | journal | personal pages | the path | help
customer service
Personals Online Network

PERSONAL JOURNAL

CROSS-REFERENCE TO RELATED APPLICATIONS

Not applicable.

STATEMENT REGARDING FEDERALLY SPONSORED RESEARCH

Not applicable.

FIELD OF THE INVENTION

The invention relates to a method for tracking personal contacts with other people over a computer network. More particularly, the method and apparatus provide a personal journal for use over a computer network.

BACKGROUND OF THE INVENTION

Many people are familiar with the "personals" section of many newspapers. The personals are advertisements placed by people who would like to meet other people with similar likes and interests. People place personal advertisements in newspapers to find activity partners, to make new friends, to make acquaintances or to find people with whom intimate relationships may be formed.

Various types of publications print personals, including newspapers and magazines. The method by which a personal ad is placed and/or responded to can vary. For example, a telephone system may be employed to place ads which are then printed in a newspaper or magazine. Responses to personals may be telephone responses in the form of recorded voice messages which are stored for retrieval.

Some publications (referred to herein as the "client") enlist the services of another organization (referred to herein as the "vendor"), such as Tele-Publishing, Inc., the Assignee of the subject invention, for the purpose of collecting and processing personal ads and providing the text of the ads in a convenient form for publication. The vendor operates a plurality of computers, referred to as call centers, to which telephone access is provided. A call center operator, or ad taker, answers telephone calls from individuals seeking to place ads (referred to herein as "advertisers") and enters the text of the personal ads onto the computer, along with other information, such as information identifying the advertiser.

In one system in which responses to personal ads are recorded voice messages, the vendor maintains a plurality of computers (referred to herein as ad response machines) on which the responses are recorded on a voice recording media. The ad response machines are located remotely relative to the vendor and more locally with respect to the clients in order to reduce the cost of placing telephone call responses. The ad taker provides the advertiser with a voice mail box, including a box number and a security code, with which telephone access to the responses is achieved. More particularly, the box number identifies a portion of the voice recording media on which responses to the advertiser's personal ad are stored and the security code ensures that the party accessing such responses is authorized to do so.

As a result of the popularity of personals advertisements in newspapers, and the advent of the Internet's World Wide Web, systems for providing personals advertisements on networked computer systems have appeared. These personals systems may be made available to the public through software applications known as Web browsers which are used to locate resources on the World Wide Web.

To date, however, these systems for providing personals on computer networks consist largely of the same information that is available in the newspaper advertisements. That is, the computerized personals merely mimic the newspaper advertisements. Conventional systems for providing personals advertisements on computer networks do not take advantage of the expanded capabilities of computer networks to track and coordinate information regarding personal contacts. With newspaper personals, one might simply circle interesting advertisements for future reference. Similarly, a person who responds to such advertisements might track his or her responses by writing down information about each such response on paper or in a "little black book." Personals systems that operate over computer networks fail to improve upon these manual systems.

SUMMARY OF THE INVENTION

In accordance with the present invention, a system for tracking personal contacts made through a personals system, a personal journal, includes means for identifying other users of the personals system, means for generating journal entries corresponding to the other users, means for storing the journal entries and means for displaying the journal entries. In one embodiment, the system may be used to provide a personal journal for use in a personals-on-line network. In this embodiment, remote users may connect to the personals-on-line network through a larger network, such as the Internet. The personals-on-line network includes at least one server computer which can be accessed by the remote users.

The system may include a variety of ways for users to identify other users for inclusion in the personal journal. In one embodiment, the personals system includes a variety of profile data regarding each of the users of the system. The profile data may include both characteristic data, which describes the user who wishes to identify other users, and criteria data, which describes the criteria that the user would like to find in other users of the system. Using this data, the system of the invention may provide profile searching capabilities to allow a user to identify other users having certain characteristics. The system of the invention may also provide a bi-directional matching function which compares a user's characteristic and criteria data to the characteristic and criteria data of other users.

Having means for identifying other users of the system that a user may wish to contact, the system further provides a means for generating journal entries that correspond to such other users. In one embodiment, the journal entries include information such as the name of the user who "owns" the journal, the name of the other user or users that the "owner" has or wishes to contact, the date and contents of the last electronic mail message sent by the owner to the other user identified in the journal entry, the date and contents of the last electronic mail message received by the owner from the other user identified in the journal entry, and comments entered by the owner regarding the other user identified in the journal entry.

The system of the invention stores each journal entry, and displays the personal journal to the journal owner upon request. The owner of a journal may also edit or modify the entries in his or her journal.

An electronic mail messaging function may be provided in conjunction with the system of the invention. In one embodiment, the electronic mail messaging is anonymous. That is, users may send messages to each other without knowing each other's true identity or electronic mail address. In an additional embodiment, users must pay a fee to send electronic mail messages by placing a "stamp" on the message. In a further modification of this embodiment, users may be provided with an option to prepay for another user's response to an electronic mail message.

BRIEF DESCRIPTION OF THE DRAWINGS

The features of the invention may be more fully understood from the following detailed description of the drawings in which.

DETAILED DESCRIPTION OF THE INVENTION

The present invention is described in conjunction with an on-line personal advertisement system that provides to a first user information associated with at least one other user of the system based on characteristic and criteria data of the first user and the at least one other user. However, the present invention is useful in many applications for matching individuals and items using a wide variety of characteristic and criteria data. Accordingly, the invention is not to be limited to the particular context, application or embodiments described herein.

Figure 1:
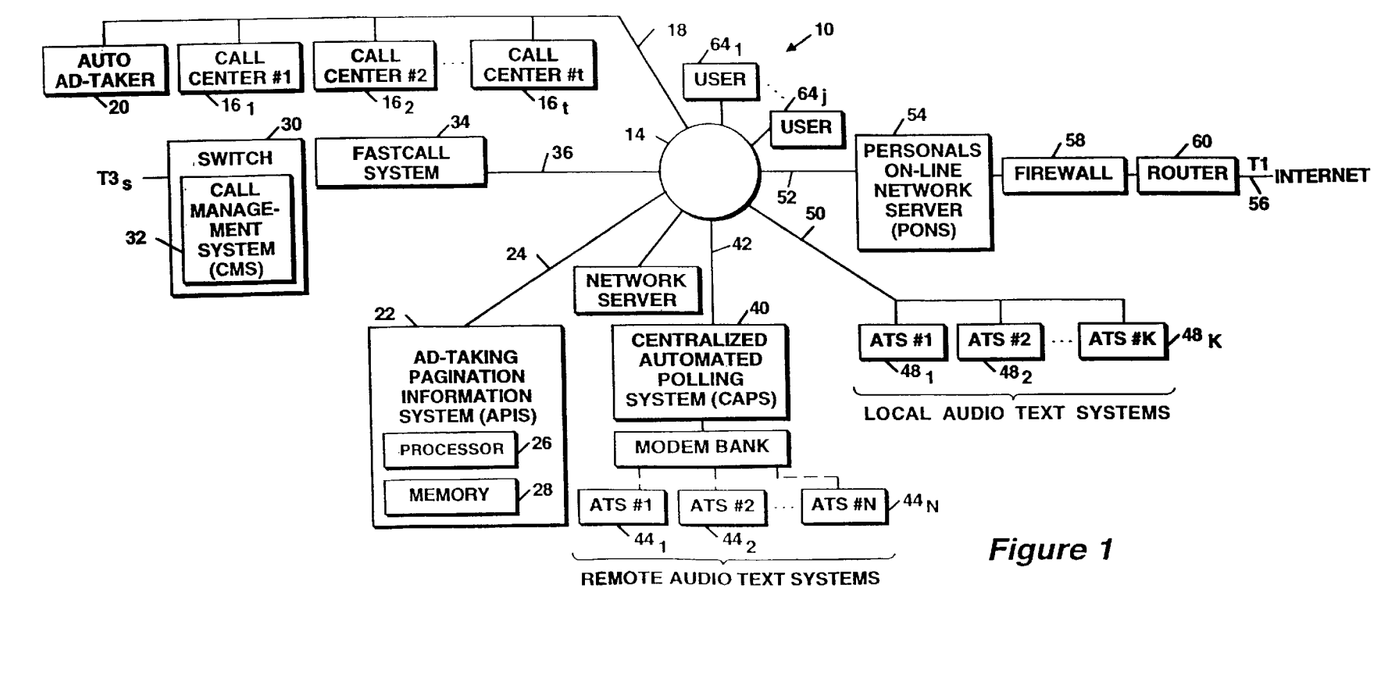
FIG. 1 is a block diagram of a network system for receiving, storing and processing personals advertisements.

Referring to FIG. 1, a network 10 is shown for receiving personal advertisements ("personals"), storing the personals and storing responses to the personals. While the present invention is described with particular reference to apparatus and methods for processing personal ads, it will be appreciated by those of ordinary skill in the art that various text can be processed by the apparatus and techniques described and claimed herein. Further, the particular network apparatus and architecture is illustrative only and can be varied without departing from the spirit of the invention.

The network 10 is used by a vendor to collect, store, process and distribute personals to one or more clients for publication and to store responses to the published ads. The network 10 includes a vendor network 14 which, in the illustrative embodiment, is a Local Area Network (LAN) 14.

A plurality of call centers $16_1$–$16_r$ for receiving personal ads via telephone lines are coupled to the vendor network 14 via a communication link 18, such as an Ethernet link. Each of the call centers $16_1$–$16_r$ includes a telephone line and a computer, such as a personal computer or workstation, at which an operator, or ad taker, is stationed. The ad taker answers telephone calls from individuals seeking to place personal ads (i.e., advertisers) and enters information gathered from the advertisers onto the call center computer. Each ad taker has a particular set of skills which, for example, may include an ability to speak a foreign language or specialized training in taking ads for a particular client. Calls are routed to a call center at which the ad taker is qualified to answer the particular call.

When an operator answers a telephone call, one or more ad taking screens appear on the display of the call center computer. The ad taking screens include a field identifying the client for which the ad is being placed and, further, include a plurality of fields that the ad taker completes in response to information provided by the advertiser. As examples, the advertiser provides and the ad taker enters the advertiser's name, address, telephone number, e-mail address (if any), category of the ad sought to be placed (e.g., female seeking male), text of the ad and answers to certain survey questions that the ad taker may ask. The survey questions may be developed by, and for the benefit of the vendor and/or the client.

Also coupled to the communication link 18 is an automated ad taker 20 by which personal ads can be placed via an automated telephone system. A caller to the automated ad taker 20 is prompted by a voice recording to answer a series of questions. The caller's answers are recorded and later transcribed onto ad taking screens of a call center computer.

Personal ads placed via the call centers $16_1$–$16_r$ or the automated ad taker 20 are stored in a database of an Ad Taking Pagination Information System (APIS) 22, referred to alternatively as an ad taking system, which is coupled to the vendor network 14 via a communication link 24, such as an Ethernet link. More particularly, APIS 22 includes a memory 28 in which the database is stored and a processor 26 on which a program is executed for managing certain operations of the network 10, as will be described. In the illustrative embodiment, APIS 22 is implemented on an Alpha computer of Digital Equipment Corporation.

Also coupled to the vendor network 14 are a telephone switch 30 including a Call Management System (CMS) 32 and a Fastcall system 34 including a Computer Telephone Integrator (CTI), both of which are products available from AT&T. The switch 30 is coupled between the Fastcall system 34 and a plurality of telephone lines, such as T3 lines, and routes the calls through the Fastcall system 34 to an appropriate one of the call centers $16_1$–$16_r$, as will be described. The Fastcall system 34 functions as an interface between the switch 30 and the network 14.

A plurality of local Audio Text System (ATS) machines $48_1$–$48_K$ are coupled to the vendor network 14 via a communication link 50, such as an Ethernet link. A plurality of remote ATS machines $44_1$–$44_N$ are coupled to the vendor network 14 via a first communication link, such as an Ethernet link 42, a Centralized Automated Polling System (CAPS) 40, a modem bank 46 and a plurality of telephone lines 62, as shown. The ATS machines permit telephone responses to personals published by the vendor's clients to be recorded, stored and accessed by the advertiser. Each of the ATS machines $44_1$–$44_N$ and $48_1$–$48_K$ includes a telephone interface to Plain Old Telephone Service (POTS) lines and T1 lines (not shown) through which personals responses are placed and accessed, a processor and media for recording and storing voice messages. In the illustrative embodiment, responses to ads are placed by calling a "900" number.

The voice recording media of each ATS machine is partitioned into a predetermined number of sectors (referred to as boxes), with each such box being telephone accessible by entering a number assigned to the box (i.e., a box number) and a corresponding security code. Associated with each box is a start date which indicates when the box is available and an end date which indicates when the box is no longer available.

The ATS machines $48_1$–$48_K$ are local in the sense of being located in relatively close proximity to the vendor and the ATS machines $44_1$–$44_N$ are remote in the sense of, generally, being located a significant distance from the vendor. Each of the remote ATS machines $44_1$–$44_N$ is located proximal to one or more of the vendor's clients, thereby enabling responses to personals to be made with less expensive telephone calls. In the illustrative embodiment, there are on the order of thirteen local ATS machines $48_1 48_K$ and on the order of eighty remote ATS machines $44_1$–$44_N$. However, it will be appreciated by those of ordinary skill in the art that the number of ATS machines, both local and remote, is a function of the number of clients serviced by the vendor, their geographic locations and the capability of each ATS machine.

The CAPS 40 communicates with the local ATS machines $48_1$–$48_K$ and the remote ATS machines $44_1$–$44_N$ for the purpose of obtaining certain statistical information from the ATS machines. Such statistical information includes, for each ad placed, a list of parameters applicable to the ad, and is used to verify a profile of the client used in text production, as described further in conjunction with FIGS. 6, 7 and 7A. Production refers to the accumulation and processing of personal ad text by the vendor and distribution of such text to a client. The client profile includes a list of various ad parameters and a corresponding weight assigned to each listed parameter, as will be discussed. CAPS 40 polls local and remote ATS machines at predetermined times (i.e., scheduled polling) as a function of the timing of production, and may also poll ATS machines in response to specific requests by APIS 22.

CAPS 40 also communicates with the ATS machines $44_1$–$44_N$, $48_1$–$48_K$ at the request of APIS 22 for the purpose of obtaining new box numbers and security codes to provide to advertisers and to cancel boxes whose end date has occurred. More particularly, APIS 22 stores one or more "box pools" (FIG. 4) for each of the vendor's clients, with each box pool including a list of available box numbers and corresponding security codes available to the client's advertisers. APIS 22 includes a box management program executed on the processor 26 by which the box pools are replenished and boxes are cancelled, as described in conjunction with FIGS. 5 and 5A.

The vendor network 14 may be further coupled to the Internet. To this end, a Personals On-line Network Server (PONS) 54 is coupled to a T1 line 56 to the Internet, typically via a firewall 58 and a router 60, as shown. Personal ads placed via the call centers $16_1$–$16_t$ may be posted on a client's web site via the server 54. Alternatively, personal ads may be posted directly onto the Internet. Further, responses to personals accessible via the Internet may be in the form of e-mail responses over the Internet and stored on the server 54. The PONS 54 is described in greater detail in a U.S. patent application entitled "Interactive Personals Online Network Method and Apparatus" which is assigned to the assignee of the subject invention and filed on even date herewith and incorporated herein by reference.

One or more user machines $64_1$–$64_j$ located at the vendor's facility are coupled to the vendor network 14 for purposes of maintenance, monitoring and updating the system. Such user machines $64_1$–$64_j$ typically take the form of personal computers, such as Apple Macintosh computers. A network server 38 is likewise coupled to the vendor network 14 and manages various communications between network components, as will be described.

Figure 2:
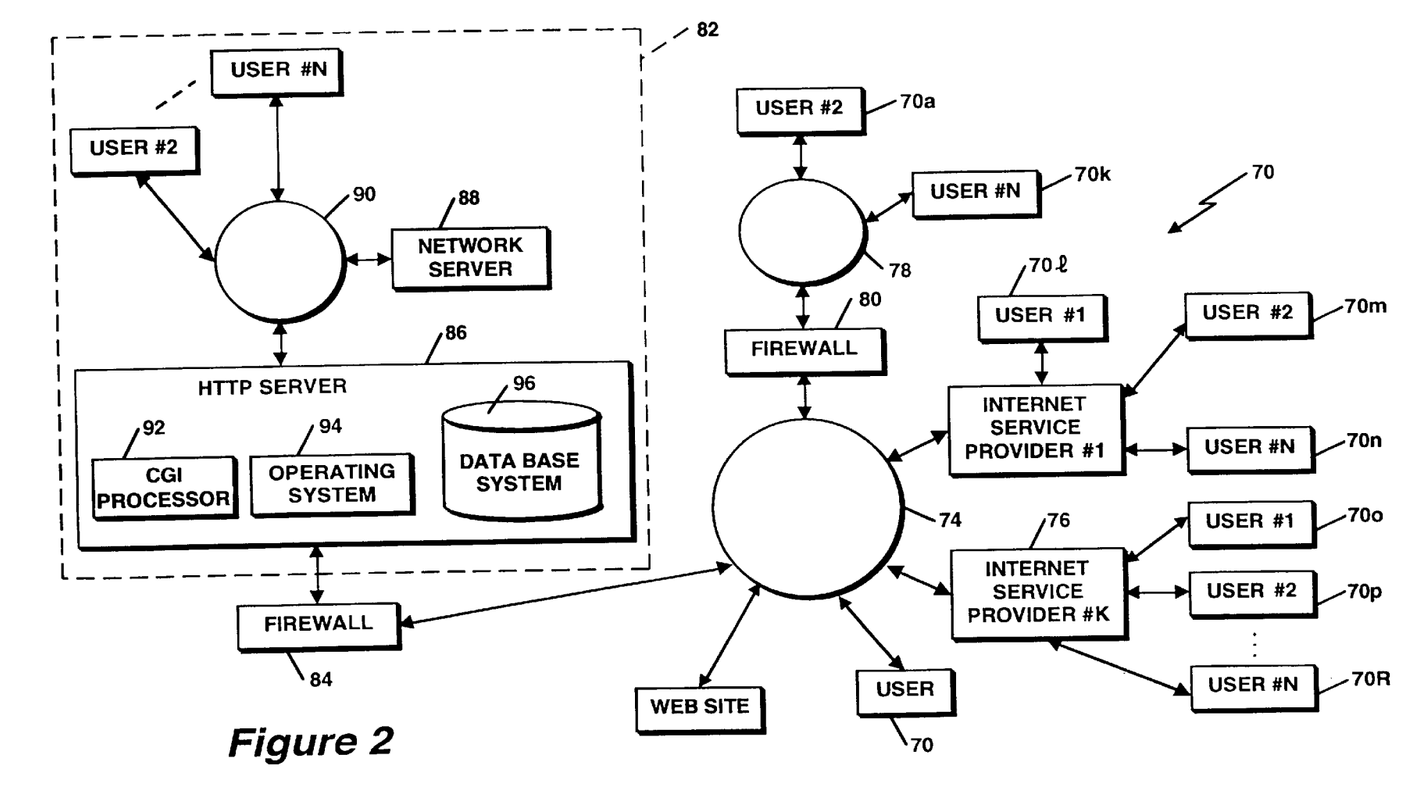
FIG. 2 illustrates an exemplary apparatus for providing a personal journal.

An exemplary apparatus for providing a personal journal will now be described by reference to FIG. 2. One or more of a plurality of remote user terminals 70a-70R generally denoted 70 may access a local computer network 72 by connecting the remote user's computer terminal 70 to a computer network such as the Internet 74. As used herein, the term "internet" generally refers to any collection of distinct networks working together to appear as a single network to a remote user. The term "Internet" on the other hand, refers to the so-called world wide "network of networks" that are connected to each other using the Internet protocol (IP) and other similar protocols. The Internet provides file transfer, remote log in, electronic mail, news and other services.

A remote user may connect a remote computer 70 to the Internet 74 in a variety of manners known in the art. A common method of making such a connection involves allowing the remote computer 14 to communicate with an Internet Service Provider ("ISP") 76 over telephone or other communication lines using a modem. The remote user 70 then accesses services available on the Internet 74 through the ISP's Internet communication facilities. Alternatively, users 70 may be coupled to the Internet 74 via a local area network 78 and a firewall 80.

A local computer network 82 is also connected to the Internet through a firewall 84 in one of the variety of manners known in the art. The local computer network 82 includes a least one server computer such as a Hypertext Transfer Protocol (HTTP) server 86 and a network server 88. HTTP server 86 and network server 88 are coupled via a communication path 90. HTTP is a network protocol used for transmission of files and other data on the World Wide Web. Thus, HTTP servers are commonly referred to as Web servers.

The remote users 70 may communicate with the HTTP server 86 using a software application known in the art as a Web browser. A Web browser and Web server have a client-server type relationship. More specifically, a Web browser is an HTTP client which sends requests to an HTTP server. The HTTP server responds to the requests by transmitting to the HTTP client resources identified by the request. Resources may be located on the Internet 74 using a Uniform Resource Locator ("URL"). Use of URL's is common in the art. By way of example, an HTTP server of the assignee of the present application may be addressed by the URL "http://www.tpigroup.com".

Resources that may be addressed over the Internet 74 include Hypertext Markup Language ("HTML") files. HTML is a document description language that defines the various components of a World Wide Web page. World Wide Web pages often include text and graphics as well as "links" which allow a viewer of the page to address other resources on the Internet including other HTML pages.

Resources that may be addressed over the Internet 74 also include software application programs. The Common Gateway Interface (CGI) is a standard for interfacing external software applications with information servers such as HTTP servers. A CGI program may be written in any programming language that may be executed on the computer network 82. Suitable programming languages include C/C ++, Fortran, PERL, TCL, any Unix shell, Visual Basic or Java.

The exemplary HTTP server 86 executes one or more CGI programs 92 resident therein. The CGI programs 92 may be executed on an HTTP server 86, or on a separate computer connected to HTTP server 86 such as network server 88. The CGI programs may access an operating system 94 in order, for example, to access variables relating to the computing environment in which the CGI programs 92 are executed.

The CGI programs 92 may also access one or more databases 96 which reside in the server 86 or another processor or storage device provided as part of the local computer network 88. A CGI program 92 may access the one or more databases by having query commands embedded in the CGI programs 92. These query commands may be provided in Structured Query Language (SQL). SQL is an industry standard query language which allows access to data in relational database management systems such as database system 96 for example.

Thus, a remote user 70 may access and use database 96 over the Internet 74 using the computer system of the invention by addressing a URL which corresponds to a CGI program 92 which accesses the desired database 96.

A method and apparatus of the invention for providing a personal journal may be used in conjunction with a Personals On-line Network ("PON"). The PON may be implemented over the Internet 74 using HTML pages and CGI programs. The PON may include personals advertisements as well as more specific profile information regarding the advertiser and regarding the type of person that the advertiser would like to meet. The PON may provide searching facilities which allow users of the system to search other users' profiles in an attempt to find a match. The PON may provide electronic mail messaging, including anonymous electronic mail messaging, between users of the PON system. The PON may also provide a method and apparatus for storing voice greetings.

In the PON system described herein, reference is made to characteristic and criteria data. As used herein, characteristic data refers to information that describes a user. For example, characteristic data elements associated with the first user refer to the gender of the first user, the drinking habits of the first user, and other such information. Criteria data refers to the characteristics preferred in another user by the first user. For example, the criteria data of the first user can include a requirement that another user be a specified gender or that another user have certain drinking patterns. Thus, characteristic data refers to the first user and criteria data refers to the preferences of the first user with respect to another user.

User characteristic and criteria data collected from users by the PON system includes gender data and identification of the gender and type of relationship that is desired, age characteristic data and age criteria data in the form of a range of ages, ethnicity characteristic data and ethnicity criteria data, body type characteristic data in the form of height and body type characteristic data. In an exemplary embodiment, users may also provide body type characteristic and criteria data from listed possibilities, such as slim, athletic, average, a few pounds overweight, and overweight. It will be appreciated that more and fewer choices, using different terms can be used. Also, for each of the data elements the user selects from the listed choices that are appropriate for the particular data. For example, smoking and drinking characteristic and criteria data provide choices such as no preference, never, occasionally and regularly. For educational level, a user may choose from no preference or prefer not to answer, high school, some college, completed college, and post-college. In an illustrative embodiment, the user can specify that another user has completed at least one of the listed levels of education. The listed choices shown represent one embodiment with many other choices also being possible without departing from the scope of the invention. Similarly for other characteristic and criteria data elements which are not to be limited to the particular embodiments shown and described herein. Further, more and less characteristic data and criteria data elements, having more and fewer choices are possible.

A user can choose not to provide a certain characteristic by responding "I prefer not to answer". Similarly, the user can decline to express a preference for certain criteria data by responding "No preference". The corresponding characteristic or criteria data element is then treated accordingly as described in conjunction with the process steps associated with forming a search string. Suffice it to say that a no preference response will not limit the search for other users for the particular element.

In an exemplary embodiment, the obtained characteristic and criteria data is stored in first and second tables, wherein a row is provided for each user of the system. In one embodiment, the first table, Table I below, stores data that in an illustrative embodiment must be provided in order to do a search. This data is the gender and type of association that is desired in another user. The second table, Table II below, is an illustrative embodiment of a table storing data associated with a user including exemplary characteristic and criteria data.

TABLE I

| FIELD | DESCRIPTION |
| --- | --- |
| USER_ID | Handle |
| SEEK_GENER | Gender sought by user |
| SEEK_FOR | Type of association sought by user |

TABLE II

| FIELD | DESCRIPTION |
| --- | --- |
| USER_ID | Handle |
| SEQ_ID | sequential ID |
| CLIENT_ID | identifies client newspaper |
| BOX_NO | mailbox from audiotext system to record greeting |
| INTERNET | user sign up from Internet? |
| FLAGS | i.e., send automatch mailings? |
| PRIV_PW | login password |
| VRFY_PASSWD | verify email addresses reply mail |
| VERIFIED | has email address been verified? |
| PERSONAL_TEMP | template code for personal page being edited |
| PERSONAL_PG | template code of personal page |
| STAMPS | number of stamps that have been paid for |
| CREATED | date user created |
| LAST_ACT | last login date |
| MATCHED | date user was last matched |
| FNAME | first name |
| LNAME | last name |
| ADDR_A | first address |
| ADDR_B | second address |
| CITY | city |
| STATE | state |
| ZIP | zip code |
| COUNTRY | country |
| AREACODE | area code |
| PHONENUMBER | phone number |
| GET_MAILINGS | get mailings? |
| EMAIL | email address |
| HEADLINE | headline of personal ad |
| BODY | body of ad |
| EXPIRES | date web ad expires |
| STATUS | approved, unapproved, or rejected |
| SEX | gender |
| BIRTHDAY | date of birth |
| ETHNO | ethnicity |
| RELIGION | religion |
| CHILDREN | parental status |
| SMOKING | smoking status |
| DRINKING | drinking status |
| BODY_TYPE | type of body |

TABLE II-continued

| FIELD | DESCRIPTION |
|---|---|
| EDUCATION | educational background |
| HEIGHT | height |
| AGE | age |
| LOCATION | location |
| LATITUDE | geographic latitude |
| LONGITUDE | geographic longitude |
| ETHNO_PREF | preferred ethnicity |
| RELIGION_PREF | preferred religious affiliation |
| CHILDREN_PREF | preferred parental status |
| SMOKING_PREF | preferred smoking status |
| DRINKING_PREF | preferred drinking status |
| BODY_TYPE_PREF | preferred body type |
| EDUCATION_PREF | preferred educational level |
| HEIGHT_MIN | preferred minimum height |
| HEIGHT_MAX | preferred maximum height |
| AGE_MIN | preferred minimum age |
| AGE_MAX | preferred maximum age |
| LOCATION_PREF | preferred geographical location |
| HAS_PROFILE | have a profile? |
| HAS_GREETING | have a greeting? |
| HAS_REMOTE_GREETING | have an audiotext greeting? |

Tables I and II are exemplary embodiments and the invention is not to be limited thereto. Also, the user may choose not to provide certain characteristic data and may decline to specify a preference with respect to one or more of the criteria data elements.

A user can request a search of the database for other users based on characteristic and criteria data. In another embodiment, the system can periodically examine the database to search for users for which there is a bi-directional match of characteristic and criteria data. A search string is formed to match the user's criteria data with the characteristic data of other users and the user's characteristic data with the criteria data of the other users. After forming the search string, the database is searched using the string to obtain a list of matches. The search results in the form of matches, may then be provided to the user. Searching and matching functions which may be provided with the PON system are described in greater detail in pending U.S. patent application Ser. No. 08/874,564 entitled "Method and Apparatus for Matching Registered Profiles" which is assigned to the assignee of the present invention, filed on even date herewith, and incorporated herein by reference.

The PON system may also provide electronic mail messaging ("email"). In an exemplary embodiment, the email system provides anonymous email and users pay, using stamps, to send email. Anonymous email is provided by assigning to each user an anonymous email address. Such an address may consist of the user's user identification name. For example, an anonymous email address provided by the PON system might be "username@anon.tpigroup.com". Because the PON system stores the true email address of each user (see "email" in Table II above), the PON system may reroute anonymous mail messages that are addressed to user names within the PON system to the true email addresses of the users. In this way, users of the PON system exchange email based only on their usernames and without exchanging true email addresses.

The PON system may charge users a fee for sending anonymous email by tracking the number of "stamps" owned by each user (see "Stamps" in Table II above) and debiting a user's stamp count for each email sent. The PON system can provide a variety of methods for users to purchase stamps. Users may purchase stamps by credit card transactions over the telephone or through a Web page which may or may not be located on a secure server. Users may purchase stamps through a "1-900" number by which the users are billed for stamps purchased on their telephone bills. Whichever method the PON system provides and the user selects for purchasing stamps, the PON system credits the user's stamp account for the appropriate number of stamps based on the fee paid by the user.

The PON system may also provide an option for a user sending mail to prepay for the recipient of the mail message to reply to the user. If the user sending mail chooses to prepay for a response, a record of the prepayment is created by inserting a row in a database table of prepayment transactions specifying the username of the user buying the prepayment, the user name of the recipient of the prepayment and the date.

Figure 3:
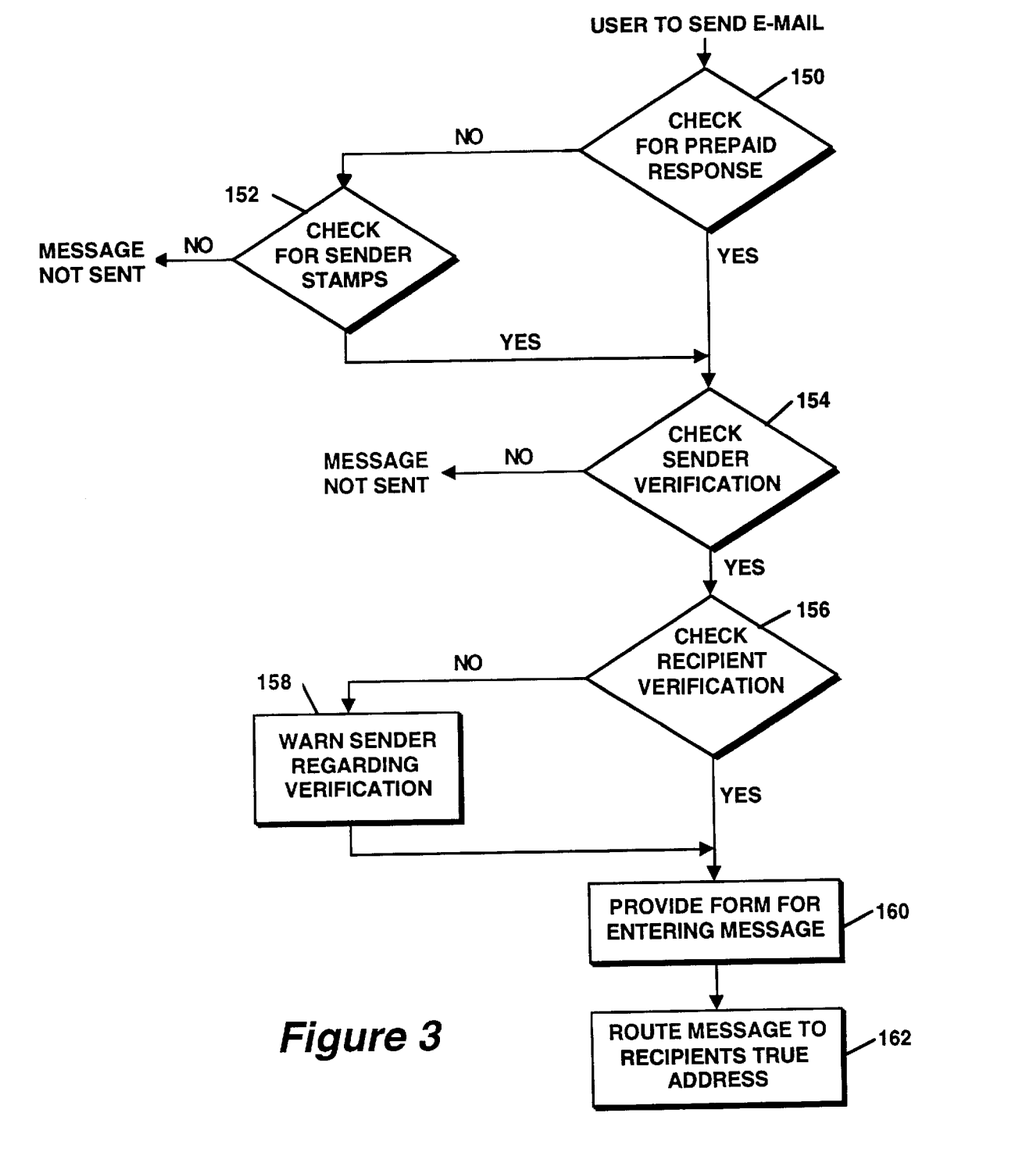
FIG. 3 illustrates an exemplary process for sending electronic mail messages in conjunction with a Personals On-line Network system.

An exemplary process for sending email within the PON system will now be described by reference to FIG. 3. When a user (a sender) wishes to send email to another user of the PON system (a recipient), the email system first reviews the database table of prepayment transactions to determine whether the email being sent has been prepaid (Check For Prepaid Response 150). If the email message is not a prepaid response, the email system checks whether the sender has sufficient stamps to send the email by querying the stamp total from Table II above (Check For Sender Stamps 152). If there are not enough stamps and the message has not been prepaid, the message is not sent.

If the sender is able to make the appropriate payment, the email system determines whether the sender 154 and recipient 156 have verified their email addresses by querying Table II above. The email system may verify a user's email address by asking the user to reply to an email message sent by the email system, and comparing the address from the reply to the user entered address to verify that the user has entered his or her correct email address. In one embodiment, a sender who has not verified the address may not send email within the PON system. A user may, after an appropriate warning regarding verification 158, send email to a user who has not verified his or her address.

After checking the verifications, the system provides a form for the email message being sent 160. The form may include an option for the sender to prepay for a response to the email message by the recipient. Once the sender has entered the desired message, the system routes the email message to the true email address of the recipient 162.

As used herein, the term "journal owner" refers to a remote user, or other user, who has access to a personal journal of the invention. The term "journal entry," as used herein, refers to information stored in a journal owner's personal journal relating to one other system user. Also, the term "system user" is not necessarily limited to a remote user. While generally, a journal owner must be able to access the local computer network 82 in some manner, information stored in the journal may relate to a person who is not a remote user. This might occur where the journal is implemented as part of a larger personals advertisement system in which not all of the advertisers are remote users.

Figure 4:
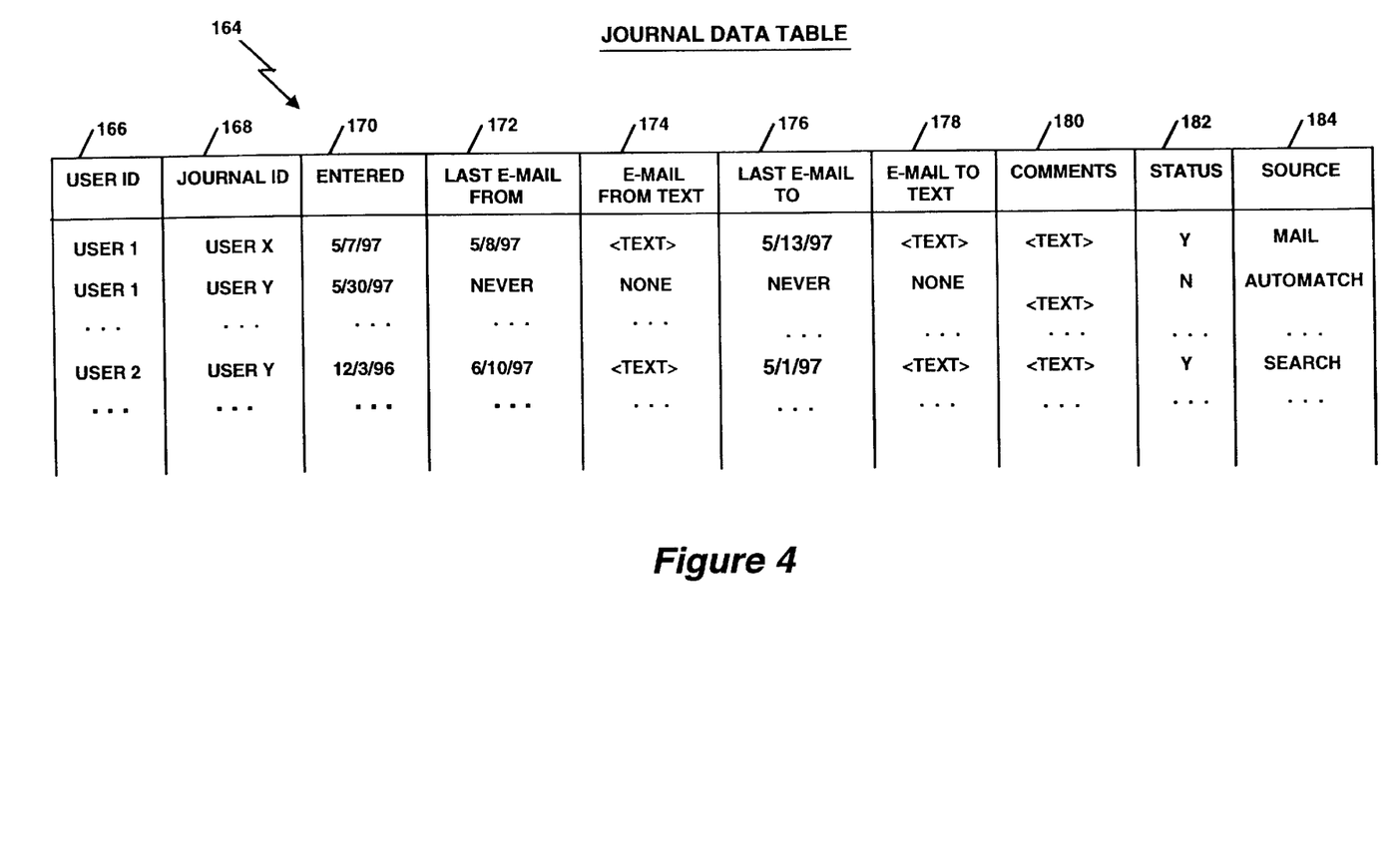
FIG. 4 is an exemplary database table for use with the personal journal of the invention.

An exemplary database table useful as the Journal Database 164 is illustrated in FIG. 4. The Journal Database Table 164 stores information relating to contacts that the journal owning user has made or may wish to make using the PON system. Each row in the Journal Database Table 164 may represent one journal entry for one user.

The Journal Database Table 164 should include a User ID field 166 which identifies which user's journal the entry should appear in. The Journal ID field 168 identifies the user who appears as an entry in the journal. The Entered field 170 stores the date upon which the journal entry was first created. The date and text of the last electronic mail message sent to the journal owner by the user who is listed in the journal entry are stored in the Last E-mail From 172 and E-mail From Text 174 fields, respectively. The date and text of the last electronic mail message sent by the journal owner to the user who is listed in the journal entry are stored in the Last E-mail To 176 and E-mail To Text 178, respectively. The Comments 180 field stores text comments entered by the journal owner regarding that journal entry. While the exemplary embodiment saves only the last e-mail sent and received, it is possible, of course, to provide variations in which all of the e-mail sent and received may be saved in the database system of the invention.

The source field 184 may store a code representing how the journal entry was added to the journal. Thus, this field may store a code signifying that the journal entry was added as a result of a direct request to add the entry by the journal owner, that the entry was added as a result of an electronic mail message sent or received, or that the entry was added as the result of a searching or matching function of the PON system.

The status field 182 may store a character representing the status of the journal entry. The status field 182 could be used for a variety of purposes. One such purpose might be to create a distinction between temporary and permanent journal entries. For example, where a journal entry is created as a result of searching or matching by the PON system or by receiving an electronic mail message, situations which are not necessarily initiated by the journal owner, the status field 182 of those entries may indicate that the journal owner has not yet chosen to add these entries to his or her journal.

In this manner, a tiered journal may be created. The first tier may be a permanent journal having all of the entries that the journal owner has chosen to put in the journal. A second tier may be a temporary journal or holding area, which would include entries that were added to the journal automatically by the PON system and that the journal owner has not yet chosen to put in the journal. The journal owner might wish to add these entries to the journal upon review.

Figure 5:
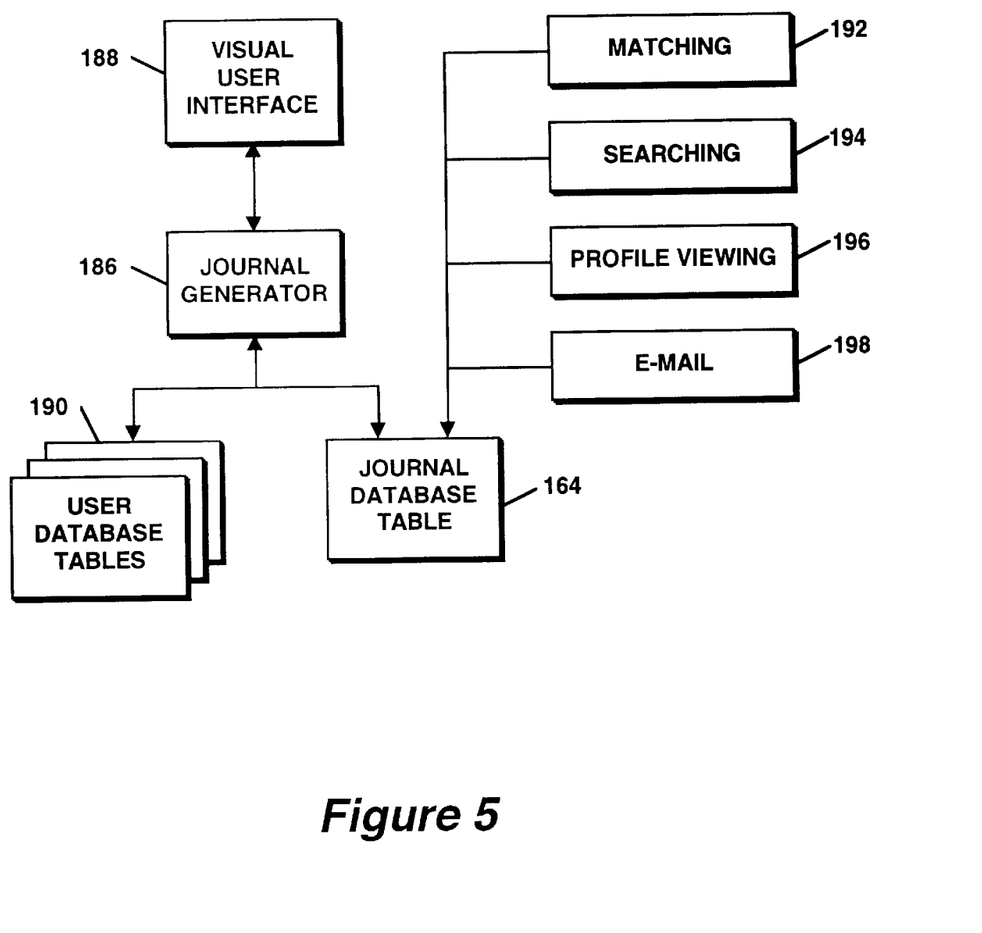
FIG. 5 is a block diagram showing an exemplary implementation of a personal journal of the invention.

The personal journal of the invention may be implemented on a local computer network, such as the local computer network 82, using a series of HTML pages and CGI programs which perform the journal functions and store journal information in and retrieve journal information from at least one database. An exemplary implementation of the personal journal is illustrated in FIG. 5.

In the illustrated embodiment, a Journal Generator 186 interacts with the Journal Database Table 164 to display a journal owner's personal journal to the owner using the Visual User Interface 188. The Journal Generator 186 may also interact with User Database Tables 190. User Database Tables 190 may include information such as that described in Table I and Table II above. By accessing the User Database Tables 190, the Journal Generator may include user profile information in the personal journal displays. Both the User Database Tables 190 and the Journal Database Table 164 may be located within the Database System 96.

Journal entries may be added to the Journal Database Table 164 in a variety of ways from within the PON system. When a Matching 192 function is performed, that function might include adding journal entries directly into the Journal Database Table 164 for each of the users with whom a match was found. Alternatively, the Matching function 192 might provide the journal owner with a display of the profile information for each match and present the journal owner with the option to add the matched users to the journal. The addition of a journal entry from a PON function such as Matching 192 may result from the insertion of a row into the Journal Database Table 164 directly from the PON function.

Journal entries may be added as a result of a Searching function 194 in the PON system as well. These entries may be added in the same ways as for the Matching function 192 as described above. Similarly, the PON system may provide a journal owner with an option to add a user to the journal owner's journal anytime that the journal owner is viewing profile information regarding the user (Profile Viewing 196), regardless of how the journal owner located the profile information. Such an addition to the journal may be made in the manner described above regarding additions by other PON functions.

The email function of the PON system 198 may also add information to the journal of the sender and the receiver of an email message. If a journal entry already exists, for example if a sender is sending an email message to a user who is already entered in the sender's journal, the journal entry is updated to reflect the date and text of the new email message. If no journal entry exists, the email system may add a row to sender's journal and to the recipients' journal.

Display of the personal journal by the Journal Generator 186 may then proceed as follows. A journal owner may access his or her personal journal from the PON system. The PON system may provide a menu, or some other suitable selection means by which the journal owner may access the journal. When the journal owner chooses to access the journal, a CGI program is initiated. This CGI program queries the Journal Database Table 164 for all journal entries belonging to the journal owner's journal. This may be accomplished by selecting each entry in which the journal owner's user identification name appears in the User ID field 166 of the Journal Database Table 164.

By using the journal owner's log in name from the PON system, where the journal owner must enter a user name and password (see Table II), to query the Journal Database Table 164, secure access is provided to the journal. Other users of the PON system can not access the journal owner's journal.

Figure 6:
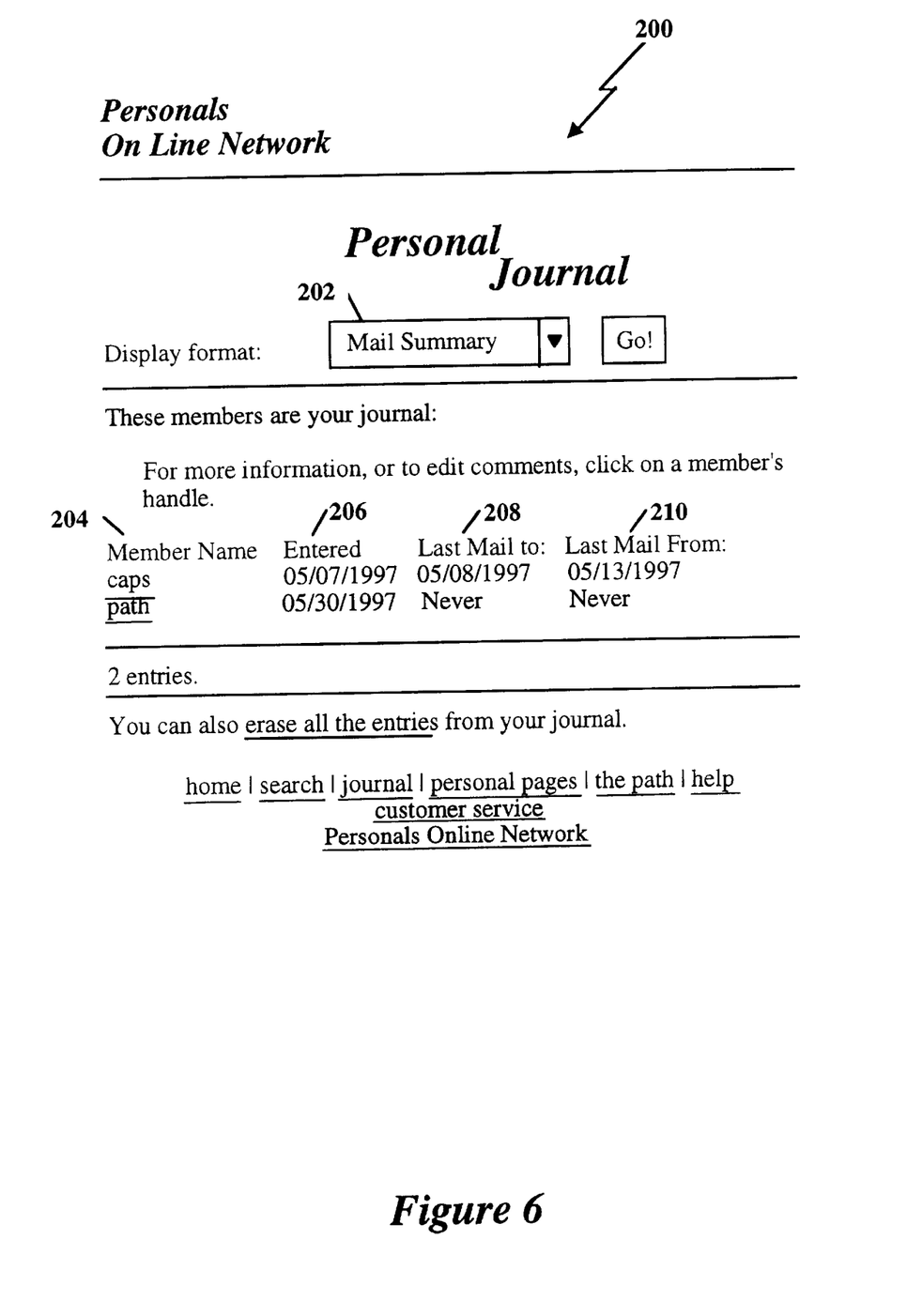
FIG. 6 is an exemplary illustration of the contents of a personal journal of the invention.

An exemplary personal journal display 200 presented in HTML format is illustrated in FIG. 6. This journal display is a Mail Summary 202 display. That is, for each entry in the journal owner's journal, details regarding electronic mail contacts between the journal owner and each user listed as a journal entry are displayed. In the exemplary display 200, two entries are shown in the journal with each entry being identified by the member name 204. The display shows the Entered 206 date, that is, the date upon which these members were added to the journal. The display 200 also shows the date of the last electronic mail message sent by the journal owner to the other users 208, and the date of the last electronic mail message sent by the other users to the journal owner 210.

Figure 7:
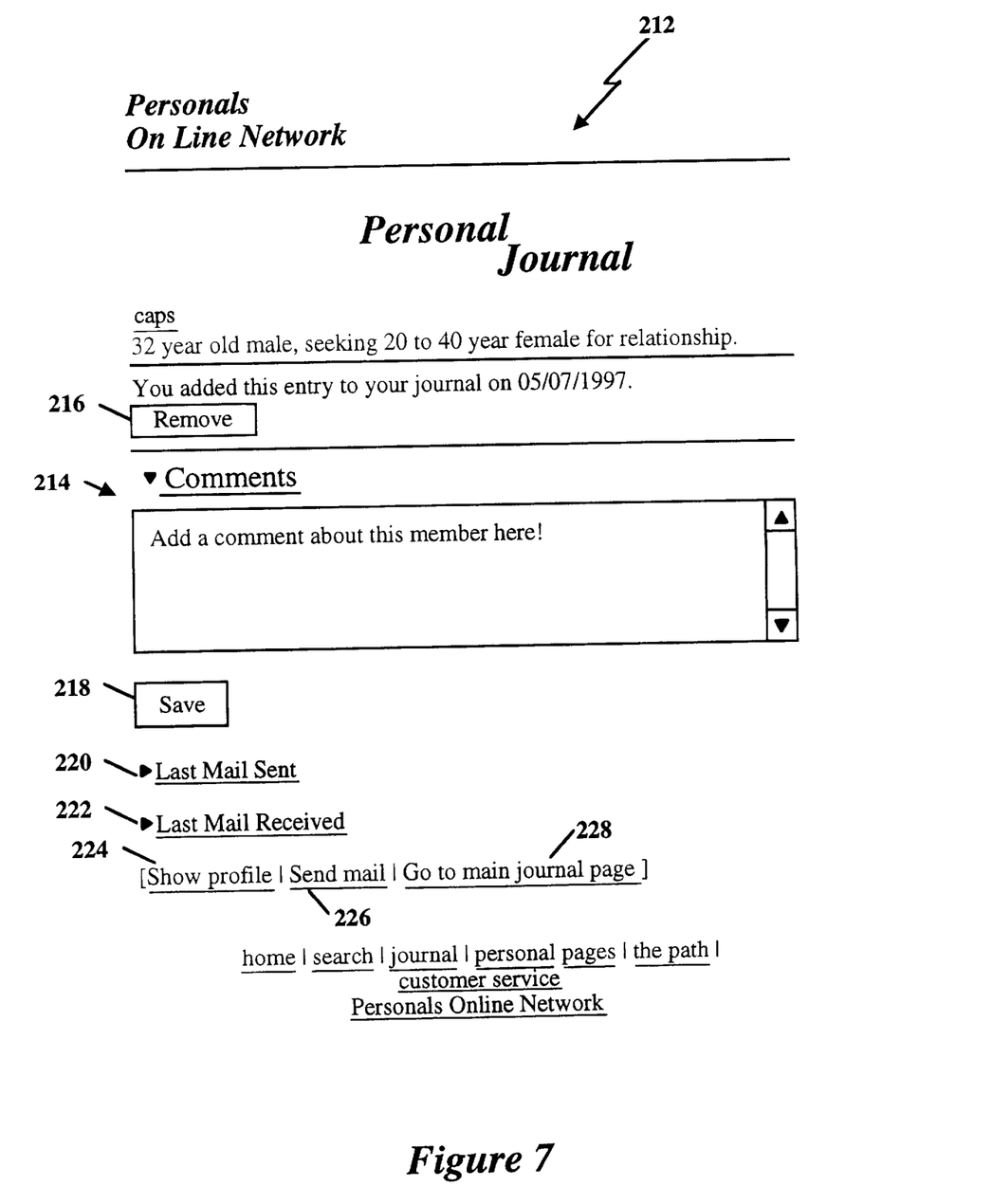
FIG. 7 is an alternative illustration of the contents of a personal journal of the invention.

The member names 204 in the exemplary display 200 are linked, using HTML, to an additional HTML display 212 (shown in FIG. 7 with respect to the "caps" journal entry) having more information about the journal entry. This display 212 provides a comments field 214 in which the journal owner may enter comments relating to this journal entry. The display 212 also provides the journal owner with options to remove 216 this entry from the journal, save 218 comments relating to "caps", review the last electronic mail message sent 220 to "caps", review the last electronic mail message received 222 from "caps", show the profile information 224 of "caps" stored in the PON system, send electronic mail 226 to "caps" or go to the journal owner's main journal page 228 (illustrated in FIG. 6).

Because the journal accesses the User Information Tables 190, and the User Information Tables 190 contain a variety of information about the users listed in a journal, the journal may also display other information, especially date related information, regarding users listed in a journal. For example, the journal might provide a tickler function that reminds the journal owner when the birthdays of users listed in the journal are approaching. The journal may even provide the journal owner with options to take actions such as sending flowers as such dates approach.

Figure 8:
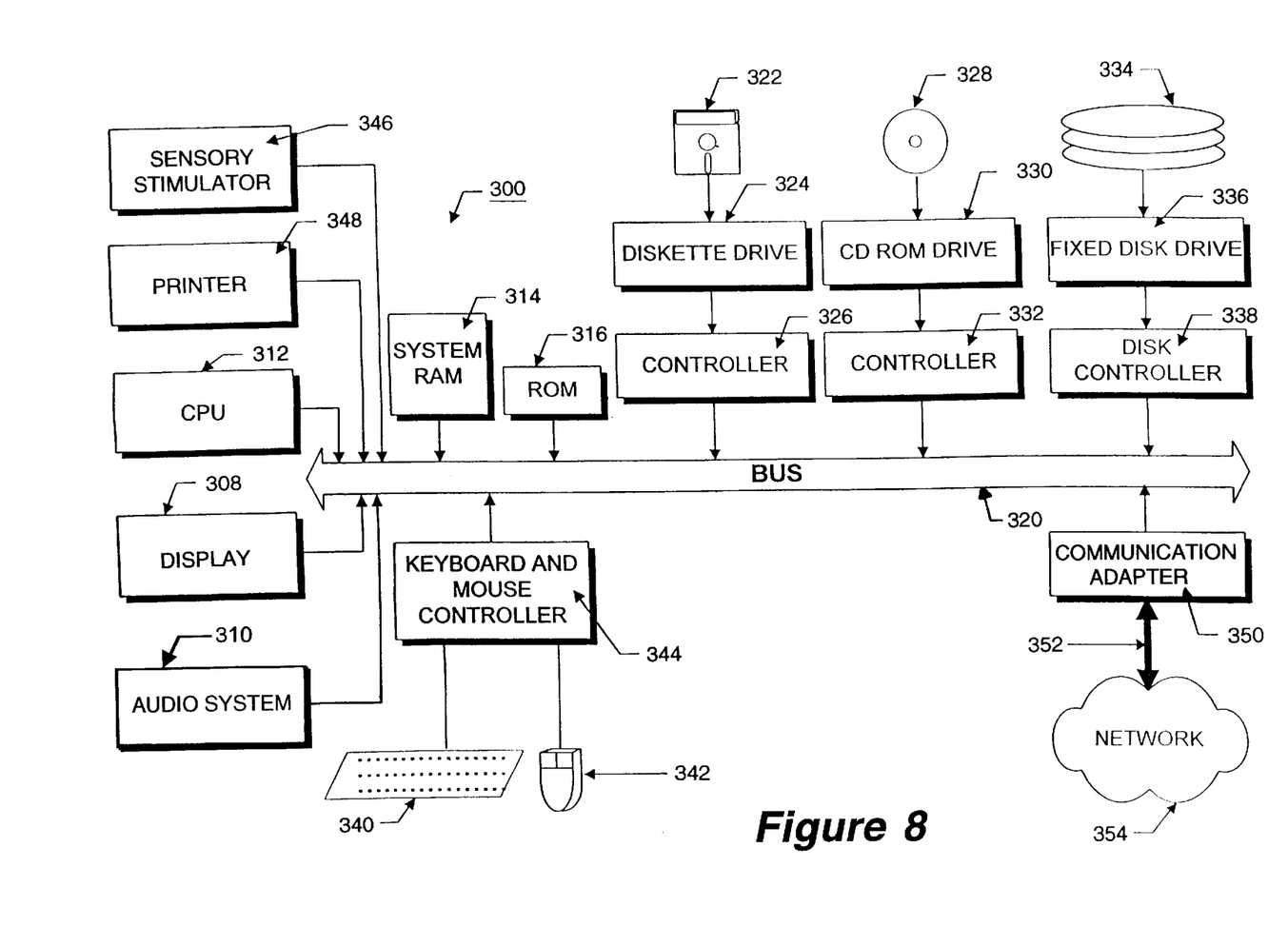
FIG. 8 illustrates a computer system on which the invention may be implemented.

Referring now to FIG. 8, a computer system 300 on which the invention may be implemented is shown. Computer system 300 may be provided, for example, as an IBM compatible computer or any other equivalent computer system. The exemplary computer system 300 of FIG. 8 is for descriptive purposes only. Although the description may refer to terms commonly used in describing particular computer systems, the description and concepts equally apply to other processing systems, including systems having architectures dissimilar to that shown in FIG. 8.

Computer system 300 includes a central processing unit (CPU) 312, which may be provided, for example, as a conventional microprocessor, a random access memory (RAM) 314 for temporary storage of information, and a read only memory (ROM) 316 for permanent storage of information. Computer system 300 also includes a display 308, an audio system 310 and a sensory stimulator 346. Each of the aforementioned components are coupled to a bus 320. Operation of computer system 300 is generally controlled and coordinated by operating system software. The operating system controls allocation of system resources and performs tasks such as processing, scheduling, memory management, networking, and I/O services, among things. Thus, an operating system resident in system memory and executed by CPU 312 coordinates the operation of the other elements of computer system 300.

Also coupled to bus 320 is a non-volatile mass storage device which may be provided as a diskette 322. Diskette 322 is insertable into a diskette drive 324 which is, in turn, coupled to bus 320 by a controller 326. Similarly, a compact disc (CD) ROM 328 is insertable into a CD ROM drive 330 which is, in turn, coupled to bus 320 by a controller 332. A hard disk 334 is typically provided as part of a fixed disk drive 336 which is coupled to bus 320 by a disk controller 338.

Data and software may be provided to and extracted from computer system 300 via removable storage media such as diskette 322 and CD ROM 328. For example, data values generated using techniques to be described above in conjunction with FIGS. 3-6 may be stored on storage media similar to media 322, 328. The data values may then be retrieved from the media 322, 328 by CPU 312 and utilized by CPU 312 to perform color printing of scanned or stored mixed color documents. Alternatively, CPU 312 may simply store such data values in ROM 316.

Alternatively still, computer software useful for matching may be stored on storage media similar to media 322, 328. Such computer software may be retrieved from media 322, 328 for immediate execution by CPU 312 or by other processors included in one or more peripherals of computer system 300 such as display 308, audio system 310 or sensory stimulator 346. CPU 312 may retrieve the computer software and subsequently store the software in RAM 314 or ROM 316 for later execution.

User input to computer system 300 may be provided by a number of devices. For example, a keyboard 340 and a mouse 342 are coupled to bus 320 by a controller 344. Sensory stimulator 346 may also function as an input device and may be provided, for example, as a hand held sensor/vibration mechanism coupled to bus 320.

Computer system 300 also includes a communications adaptor 350 which allows the system to be interconnected to a local area network (LAN) or a wide area network (WAN), schematically illustrated by bus 352 and network 354. Thus, data and computer program software can be transferred to and from computer system 300 via adapter 350, bus 352 and network 354.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

It will be understood that the foregoing is only illustrative of the principles of the invention, and that various modifications can be made by those skilled in the art without departing from the scope and spirit of the invention.

What is claimed is:

1. A personal journal system for tracking personal contacts made by a first user of a personals system comprising:
   (a) means for identifying other users of the personals system;
   (b) means for generating journal entries corresponding to other users of the personals system;
   (c) means for storing each journal entry generated;
   (d) means for displaying the journal entries to the first user;
   (e) means for sending anonymous electronic mail messages to at least some of the other users of the system: and
   (f) means for requiring and receiving payment of a fee by the first user prior to sending the electronic mail messages.

2. The system of claim 1 further comprising means for modifying stored journal entries.

3. The system of claim 2 wherein the first user uses the personals system remotely over a computer network.

4. The system of claim 1 wherein the means for identifying other users further includes profile searching.

5. The system of claim 4 wherein the means for identifying other users includes profile matching comprising:
   (i) obtaining characteristic and criteria data from users of the personals system;
   (ii) storing the characteristic and criteria data of the users of the personals system;
   (iii) comparing the criteria data of the first user with the characteristic data of at least one other user of the system;
   (iv) comparing the criteria data of the at least one other user with the characteristic data of the first user; and
   (v) providing information associated with the at least one other user to the first user for the chase where at least some of the characteristic data of the at least one other user matches the criteria data of the at least one other user.

6. The system of claim 1 wherein the means for sending electronic mail allows users to prepay for a response to an electronic mail message being sent.

7. The system of claim 1 wherein each journal entry comprises (i) a user name for the first user;

(ii) a user name for the other user identified;

(iii) a date representing the latest date on which an electronic mail message was sent by the first user to the other user;

(iv) the text of the latest electronic mail message sent by the first user to the other user;

(v) a date representing the latest date on which an electronic mail message was sent by the other user to the first user; and (vi) the text of the latest electronic mail message sent by the other user to the first user.

8. The system of claim 7 wherein each journal entry further comprises comments entered by the first user.

9. The system of claim 8 wherein each journal entry is stored as a row in a computer database table further comprises what.

10. The system of claim 9 wherein the means for displaying journal entries includes querying the computer database table containing the journal entries for journal entries belonging to the first user and displaying the information contained in first user's journal entries to the first user over a computer network.

11. The system of claim 7 wherein the means for displaying journal entries includes:

a means for displaying the user name of the other user identified for each journal entry;

an interactive means for modifying the journal entries; and a means for sending an electronic mail message to other users identified in the journal entries.

12. A computer program product comprising:

a computer useable medium having computer readable program code to provide a personals system accessible by users over a computer network;

a computer useable medium having computer readable program code to identify, for a first user of the personals system, other users of the personals system;

a computer useable medium having computer readable program code to generate journal entries corresponding to the other users of the personals system;

a computer useable medium having computer readable program code to store each journal entry generated in a database table;

a computer useable medium having computer readable program code to display the journal entries to the first user over a computer networks a computer useable medium having computer readable program code to send anonymous electronic mail messages: and a computer useable medium having computer readable program code to require and receive payment of a fee by the first user prior to sending the electronic mail messages.

13. The computer program product of claim 12 wherein the computer readable program code to provide a personals system includes computer readable program code to obtain and store profile data regarding system users, and the computer readable program code to identify, for a first user, other users of the personals system includes:

computer readable program code to search the profile data to identify other users of the personal system; and computer readable program code to perform a bidirectional match using the profile data to identify other users of the personal system.

14. The computer program product of claim wherein the computer readable program code to require and receive payment further includes computer readable program code for allowing users to prepay for a response to an electronic mail message being sent.

* * * * *

UNITED STATES PATENT AND TRADEMARK OFFICE
CERTIFICATE OF CORRECTION

PATENT NO. : 5,913,212
DATED : June 15, 1999
INVENTOR(S) : Andrew B. Sutcliffe et al.

It is certified that error appears in the above-identified patent and that said Letters Patent is hereby corrected as shown below:

Title page,
Item [57], ABSTRACT,
Line 1, reads "eThe" should read -- The --

Column 16,
Line 33, reads "claim wherein" should read -- claim 12 wherein --

Signed and Sealed this

Twenty-first Day of December, 2004

JON W. DUDAS
*Director of the United States Patent and Trademark Office*